United States Patent
Sarmah (10) Patent No.: US 9,983,889 B1
(45) Date of Patent: May 29, 2018

(54) BOOTING OF INTEGRATED CIRCUITS

(71) Applicant: Xilinx, Inc., San Jose, CA (US)

(72) Inventor: Mrinal J. Sarmah, San Jose, CA (US)

(73) Assignee: XILINX, INC., San Jose, CA (US)

( * ) Notice: Subject to any disclaimer, the term of this patent is extended or adjusted under 35 U.S.C. 154(b) by 124 days.

(21) Appl. No.: 15/154,888

(22) Filed: May 13, 2016

(51) Int. Cl.
*G06F 9/44* (2018.01)
*G06F 9/445* (2018.01)

(52) U.S. Cl.
CPC .......... *G06F 9/4416* (2013.01); *G06F 9/4401* (2013.01); *G06F 9/445* (2013.01); *G06F 9/4411* (2013.01)

(58) Field of Classification Search
CPC .... G06F 9/4416; G06F 9/4411; G06F 9/4401; G06F 9/445
See application file for complete search history.

(56) References Cited

U.S. PATENT DOCUMENTS

| | | | |
|---|---|---|---|
| 5,928,338 A | 7/1999 | Lawman | |
| 6,011,407 A | 1/2000 | New | |
| 6,028,450 A | 2/2000 | Nance | |
| 6,704,816 B1 * | 3/2004 | Burke | G06F 15/7867 708/231 |
| 7,092,689 B1 | 8/2006 | Boecker et al. | |
| 7,199,608 B1 | 4/2007 | Trimberger | |
| 7,224,952 B2 | 5/2007 | Boecker et al. | |
| 7,328,335 B1 | 2/2008 | Sundararajan et al. | |
| 7,480,347 B2 | 1/2009 | Black et al. | |
| 7,653,127 B2 | 1/2010 | Brunn et al. | |
| 7,689,726 B1 | 3/2010 | Sundararajan et al. | |
| 7,830,985 B2 | 11/2010 | Black et al. | |
| 8,265,902 B1 | 9/2012 | Brady et al. | |
| 9,147,074 B2 * | 9/2015 | Grieco | G06F 21/76 |
| 2003/0200428 A1 * | 10/2003 | Chan | G06F 9/4416 713/1 |
| 2006/0242395 A1 * | 10/2006 | Fausak | G06F 9/4416 713/1 |

OTHER PUBLICATIONS

U.S. Appl. No. 15/008,062, Jain, Sunita, filed Jan. 28, 2016, San Jose, USA.

* cited by examiner

*Primary Examiner* — Stefan Stoynov
(74) *Attorney, Agent, or Firm* — LeRoy D. Maunu; Jonathan B. Soike (57) ABSTRACT

Methods and circuits are disclosed for configuring an integrated circuit (IC) to implement a system design. In an example implementation, boot ROM code is executed on the processor circuit. The execution of the boot ROM code causes the processor circuit to determine settings used by the system design for communicating data via a communication circuit on the IC. The communication circuit is configured by the processor circuit according to the determined settings. In response to receiving one or more boot images by the processor circuit, via the configured communication circuit configured according to the determined settings, boot images are executed by the processor circuit. The execution of the boot images causes the processor circuit to configure the IC to implement the system design. During operation of the system design on the IC, data is communicated via the communication circuit configured according to the determined settings.

20 Claims, 9 Drawing Sheets

BOOTING OF INTEGRATED CIRCUITS

TECHNICAL FIELD

The disclosure generally relates to loading of boot images.

BACKGROUND

There are a variety of different applications that can use programmable integrated circuits (ICs). Programmable ICs include programmable hardware resources (e.g., programmable logic circuits and/or programmable routing resources) that can be programmed to implement various circuits. One type of programmable IC, referred to as a field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay locked loops (DLLs), bus or network interfaces such as Peripheral Component Interconnect Express (PCIe) and Ethernet, and so forth.

Some ICs include enough components and functionality to effectively serve as a computer system on a single IC chip. ICs with such functionality are sometimes referred to as a system on a chip (SOC). An SOC can include one or more processor circuits that execute software instructions in order to carry out different functions and/or include programmable hardware resources that can be programmed to form various circuit designs. Upon startup (e.g., hard-power on or hard reset), the SOC can first execute a boot read only memory (ROM) code that configures the SOC to retrieve and load a boot image. The boot image can specify how peripheral functional blocks of the SOC are configured, configure programmable resources to implement a hardware portion of a system design, setup and run the operating system (OS) to implement a software portion of the system design, and/or perform other boot-related functions. The hardware portion specifies a hardware circuit arrangement included in the system design. The software portion of the system design specifies a set of instructions that are executed by a processor of the SOC during operation of the system. Often, the boot image for an SOC can be retrieved and loaded from an external device coupled to an SOC.

SUMMARY

Various implementations are directed to methods for loading images for booting a system design on IC (e.g., a SOC). In an example implementation, boot ROM code is executed on a processor circuit on the IC when powered on. Execution of the boot ROM code causes the processor circuit to determine configuration settings used by a system design for communicating data via a communication circuit on the IC. The communication circuit is configured by the processor circuit according to the determined configuration settings. In response to receiving one or more boot images, via the configured communication circuit, the boot image(s) is executed. Execution of the boot image(s) causes the processor circuit to configure the IC to implement the system design. The implemented system design communicates data using the communication circuit configured according to the determined configuration settings.

In another example implementation, an IC includes a non-volatile memory, a communication circuit, and a processing circuit coupled to an internal data bus. The communication circuit is configured to communicate via an external data bus coupled to the IC. The processor circuit is configured to, when powered on, retrieve and execute a set of boot read only memory (ROM) code stored in the non-volatile memory. Execution of the boot ROM code by the processor circuit causes the processor circuit to determine settings used by a system design for configuration of the communication circuit. Execution of the boot ROM code also causes the processor circuit to configure the communication circuit by the processor circuit according to the determined configuration settings. The system design is stored in a device coupled to the external data bus. The processor circuit is further configured to receive one or more boot images, via the configured communication circuit, and execute the boot images to configure the IC to implement the system design.

Other features will be recognized from consideration of the Detailed Description and Claims, which follow.

BRIEF DESCRIPTION OF THE DRAWINGS

Various aspects and features of the method, device, and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

As the complexity of system designs implemented on SOCs increases, the size of the boot image and the time required to retrieve and load the boot image also increases. The increased retrieval and load time can be problematic in instances where it is desirable to have the SOC available quickly, whether upon power-up or in similar situations. In some approaches, boot ROM code may be configured to receive one or more boot images from an external device via a communication circuit (e.g., a PCIe interface) on the SOC. However, a system design implemented via execution of boot image may use a different configuration of the communication interface than that initially used to retrieve the boot images. In such situations, additional boot time may be required to reconfigure the communication interface for the new configuration settings and reestablish/retrain communication links on the external data bus.

Methods and circuits are disclosed for loading boot images for boot of an SOC. The methods and systems avoid the need to reconfigure a communication circuit and/or retrain reestablish/retrain communication links on the external data bus. In an example implementation, boot ROM code is executed on a processor circuit on an SOC when powered on. Execution of the boot ROM code causes the processor circuit to determine settings (e.g., communication circuit configuration options) to be used by a system design to be implemented on the SOC. A communication circuit on the SOC is configured according to the determined settings. The processor receives one or more boot images, via the configured communication circuit, and executes the boot images to implement the system design on the SOC. Execution of the boot image(s) causes the processor circuit to configure the IC to implement the hardware and/or software portions of a system design. Because the communication circuit is already configured according to the settings, the system design can communicate via the communication circuit without reconfiguration of the communication circuit and/or establishing/training data links.

The determined configuration settings may additionally or alternatively be used to initialize various other circuits that are not easily reconfigured following boot. As one example, the configuration settings may specify error correction code settings for configuring an on-chip memory prior to retrieving and storing any data, such as boot images, in the on-chip memory. For ease of explanation, the examples are primarily described with reference to configuration of a communication circuit during boot according to configuration settings that will be used by a system design after boot is completed.

Figure 1:
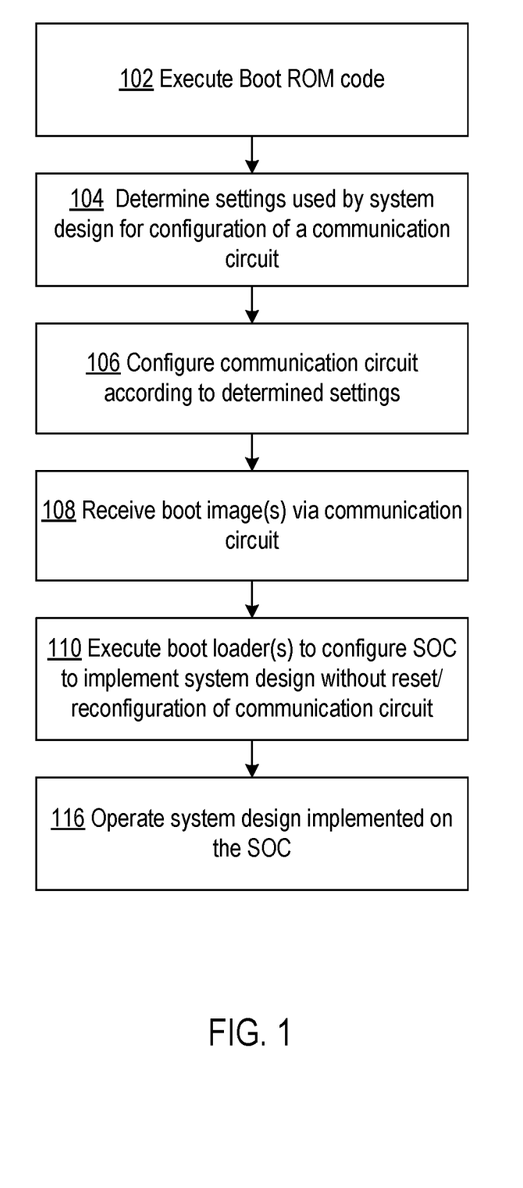
FIG. 1 shows a first example process for booting an SOC, consistent with one or more implementations.

Turning now to the figures, FIG. 1 shows a first example process for booting an SOC, consistent with one or more implementations of the present disclosure. At block 102, boot ROM code is executed by a processor in the SOC. At block 104, the execution of the boot ROM code causes the processor to determine configuration settings used by a system design for configuration of a communication circuit on the SOC. At block 106, the communication circuit is configured by the processor according to the determined configuration settings. At block 108, one or more boot images are received from a host device coupled to the SOC via the communication circuit. Transfer of the boot image(s) may be initiated and/or controlled by the SOC (e.g., by the processor or a DMA controller) or may be initiated and/or controlled by a host device coupled to the SOC. At block 110, the boot image(s) is executed to configure the SOC to implement a system design specified by the boot image. At block 116, the system design is operated on the SOC. Due to the previous configuration of the communication circuit according to the determined configuration settings, reconfiguration of the communication circuit is not required for the system design to communicate via the communication circuit. Accordingly, the SOC may forgo reconfiguration of the communication circuit prior to the communication of data by the system design. In this manner boot-up time may be reduced.

In different implementations, settings for configuration of the communication circuit used by the system design may be determined using various processes. For example, in some implementations, the configuration settings may be retrieved from an external device coupled to the SOC. Configuration settings may be retrieved from the external device using the same communication circuit used to retrieve the boot images or using a different communication circuit on the SOC. As another example, in some implementations, the configuration settings may be included in a boot image for an initial boot stage in a multi-stage boot process. As yet another example, the configuration settings may be retrieved from a non-volatile memory on the SOC. For example, the configuration settings may be written to the non-volatile memory prior to boot by a host device coupled to the SOC. The non-volatile memory may include, for example, ROM (e.g., mask ROM, PROM, EPROM, EEPROM), Flash memory, Ferroelectric RAM, and/or eFuses. Additionally or alternatively, one or more configuration settings may be determined by scanning multiplexed I/O (MIO) pins. For example, MIO pins may be used to provide, to the boot ROM code, configuration settings indicating the proper location and/or configuration of the communication circuits. In some implementations, system design may use the MIO pins as general purpose I/O after the boot process is completed.

TABLE 1 shows example binary coded values (e.g., eFuses or MIO pins) representing example configuration settings of a 4-lane PCIe circuit. In this example, four selection bits may be coded to select communication circuits of the four available PCIe data lanes for communication. Two selection bits may be coded to select a speed select communication circuits for the 4 available PCIe data lanes for communication. Some embodiments may store additional binary values to provide various additional options in addition to or in lieu of the configuration options shown in TABLE 1. Additional bits may be used, for example, for selection of communication circuits/data lanes, protocol selection options (e.g., PCIe, USB, SATA, AXI, Ethernet, and/or IEEE 802.X), data speed options, encryption options, forward error correction options, or various combinations thereof.

TABLE 1

| Transceiver select | Speed Select | Protocol speed | Link width |
|---|---|---|---|
| 0001, 0010, 0100, or 1000 | 00 | Gen1 (250 MB/s) | X1 |
| 0011, 0110, or 1100 | 00 | Gen1 (250 MB/s) | X2 |
| 1111 | 00 | Gen1 (250 MB/s) | X4 |
| 0001, 0010, 0100, or 1000 | 01 | Gen2 (500 MB/s) | X1 |
| 0011, 0110, or 1100 | 01 | Gen2 (500 MB/s) | X2 |
| 1111 | 01 | Gen2 (500 MB/s) | X4 |
| 0001, 0010, 0100, or 1000 | 10 | Gen3 (1 GB/s) | X1 |
| 0011, 0110, or 1100 | 10 | Gen3 (1 GB/s) | X2 |
| 1111 | 10 | Gen3 (1 GB/s) | X4 |

In some implementations, a SOC may be booted using a multi-stage boot process. For instance, boot images may be sequentially retrieved and executed in the boot process to configure the SOC to implement a particular system design. As an illustrative example, boot ROM code may be configured to retrieve and execute a first stage boot loader (FSBL) image. The FSBL image may be configured to, for example, implement one or more circuits (e.g., in programmable logic) to assist in retrieval of additional boot images or configuration of the SOC in subsequent boot stages. For instance, execution of the FSBL image may configure programmable resources to form circuits, such as a DMA controller or a high-speed serial interface, which may retrieve additional boot images, such as a second stage boot loader (SSBL) image, more quickly in subsequent boot stages.

Figure 2:
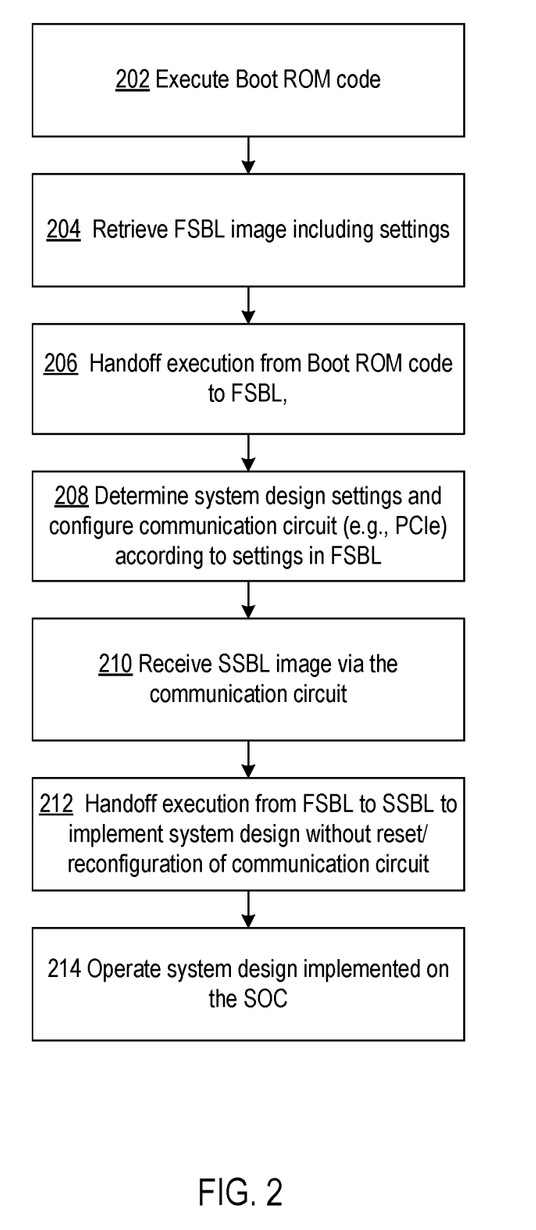
FIG. 2 shows a second example process for booting an SOC, consistent with one or more implementations.

FIG. 2 shows a flow diagram of a multi-stage process for booting a SOC, consistent with one or more implementations of the present disclosure. In this example, the boot process includes two boot stages. However, the process may be adapted to include additionally boot stages. At block 202, boot ROM code is executed by a processor in the SOC. In this example, execution of the boot ROM code causes the processor to retrieve a first stage boot loader (FSBL) image at block 204. At block 206, the boot ROM code hands off execution to the FSBL image.

In this example, the FSBL is configured to determine the configuration settings used by a system design for communication and configure a communication circuit according to the configuration settings at block 208. In some implementations, the FSBL may retrieve all or a portion of the configuration settings from an on-chip memory or external device communicatively connected to the SOC. Alternatively or additionally, a portion or all of the configuration settings may be included as part of the FSBL. Alternatively or additionally, configuration settings may be determined and used to configure various circuits of the SOC at various other stages in the multi-stage boot process. For example, the configuration settings for one or more circuits may be retrieved and used by the boot ROM code prior to handing off execution to the FSBL image.

In this example, the FSBL is further configured to retrieve a SSBL image using the configured communication circuit at block 210. At block 212, the FSBL hands off execution to the SSBL image. The SSBL configures the SOC to implement the system design. As previously described, due to the previous configuration of the communication circuit according to the determined configuration settings used by the system design, reconfiguration/training of the communication circuit is not required when the system design is implemented. The system design is operated by block 214.

Configuration settings may be written to a non-volatile memory of a SOC using various processes. In some implementations, configuration settings may be stored in the SOC, for example by a host device, prior to first boot of the SOC. In some other implementations, the SOC may be configured to detect and store configuration settings during a first boot of the SOC. In subsequent boots of the SOC, the stored configuration settings may be used to speed up the boot process as previously described.

Figure 3:
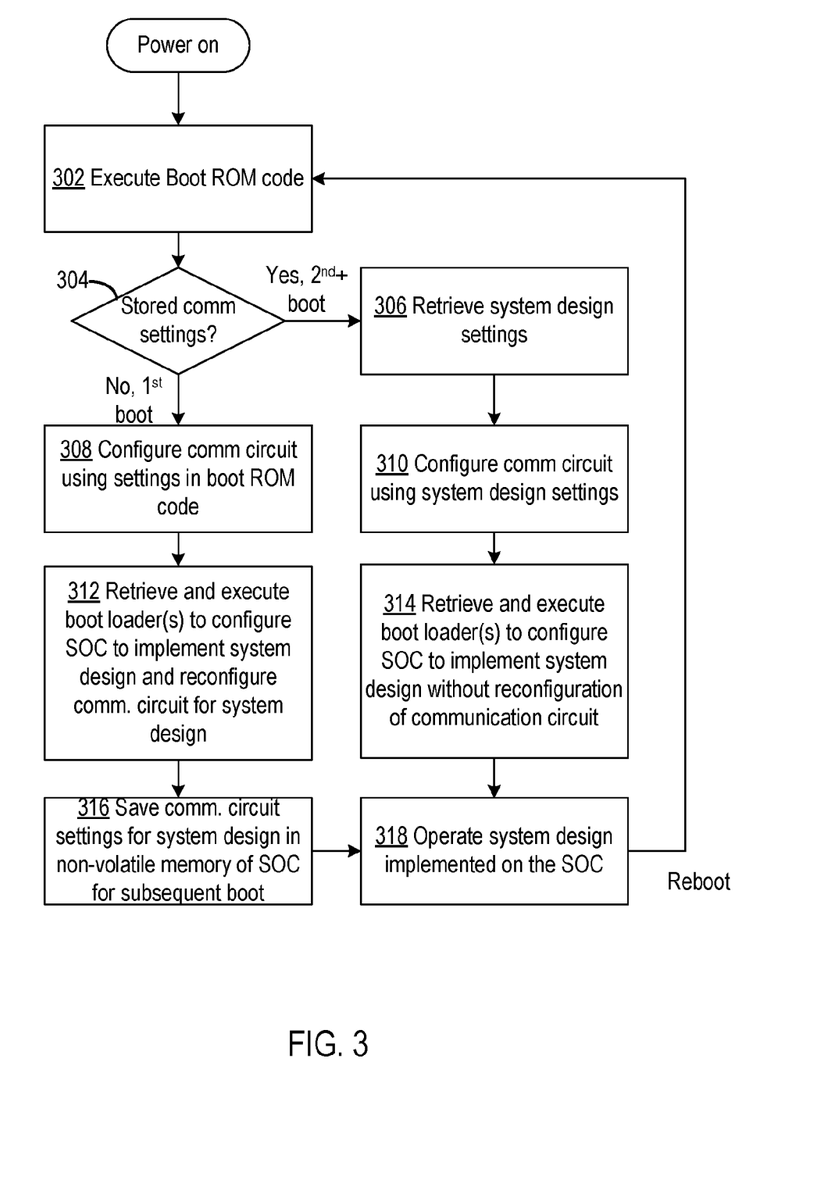
FIG. 3 shows a third example process for booting an SOC, consistent with one or more implementations.

FIG. 3 shows a flow diagram of an example booting a SOC, consistent with one or more implementations of the present disclosure. When the SOC is powered on boot ROM code is executed at block 302. If system design configuration settings have not been stored on the SOC, decision block 304 directs the process to boot the SOC using a conventional boot process at blocks 308 and 312. At block 308, a communication circuit on the SOC is configured using default configuration settings specified in the boot ROM code. At block 312, boot loader images are retrieved and executed to configure the SOC to implement a system design and reconfigure the communication circuit for use by the system design. At block 316 communication circuit settings used by the system design are stored in a non-volatile memory of the SOC for subsequent boot. The system design implemented on the SOC is operated at block 318 until the SOC is rebooted.

When the SOC is rebooted, the boot ROM code is executed again at block 302. Since stored configuration settings used by the system design are not available, decision block 304 directs the process to boot the SOC at blocks 306, 310, and 314 as previously described. At block 306, the configuration settings used by the system design are retrieved from the non-volatile memory. At block 310, the communication circuit on the SOC is configured using the retrieved configuration settings. At block 314, boot loader images are retrieved and executed to configure the SOC to implement a system design without reconfiguration and/or training of the communication circuit. The system design implemented on the SOC is operated at block 318 until the SOC is rebooted.

Figure 4:
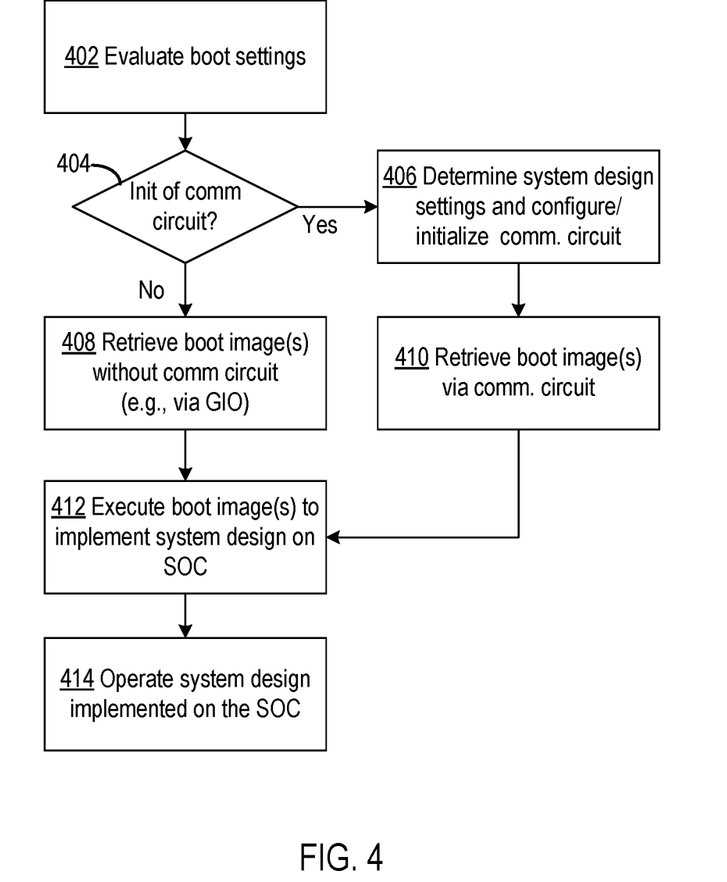
FIG. 4 shows a fourth example process for booting an SOC, consistent with one or more implementations.

FIG. 4 shows a fourth example process for boot of a SOC, consistent with one or more implementations. At block 402, boot settings are evaluated to determine whether or not communication circuits (e.g., a PCIe interface) are initialized during boot. The evaluation allows the processor to avoid determining of settings used by the system design if not configuration is performed during boot. If communication circuits are not initialized during boot, decision block 404 directs the process to retrieve one or more boot images at block 408 without use of the communication circuit. The boot images may be retrieved, for example, using general purpose I/O pins. Otherwise, decision block 404 directs the process to block 406. At block 406, configuration settings used by the system design are determined. As previously described, the configuration settings may be determined by scanning MIO pins, eFuses, or other non-volatile data storage. At block 406, the determined configuration settings are used to configure and/or initialize the communication circuit. At block 410, one or more boot images are retrieved via the configured communication circuit, for example, as described with reference to FIG. 1. At block 412, the retrieved boot images are executed to implement the system design. The system design is operated by block 414.

Figure 5:
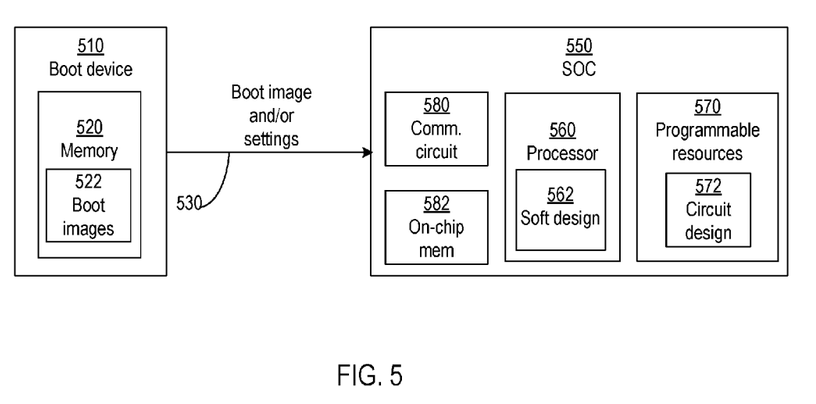
FIG. 5 shows a block diagram of a SOC configured to receive a boot image via an external data bus, consistent with one or more implementations.

FIG. 5 shows a block diagram of a SOC configured to boot, consistent with one or more implementations. The system includes a SOC 550 having a processor 560 that may be configured to implement a software portion of a system design. The SOC 550 also has a set of programmable resources 570 that may be configured to implement a circuit portion of the system design. The SOC 550 also includes a communication circuit 580 and an on-chip memory 582 that may be used by the processor 560 and/or programmable resources 570 during operation. When the SOC 550 is powered on, a boot ROM code is retrieved from the on-chip memory 582 and executed by the processor 560.

As described with reference to FIGS. 1, 2, 3, and 4, the boot ROM code may cause the processor to retrieve one or more boot images 522 from a memory 520 or a boot device connected to the SOC via an external data bus 530. The boot images are executed by the processor 560 to cause the programmable resources 570 and/or processor 560 to implement a system design 562 and 572.

Execution of the boot ROM code and/or one or more of the retrieved boot images 522 may configure and initialize the communication circuit 580. For example, the boot ROM code may use a high speed communication circuit (e.g., PCIe) to retrieve the boot images 522 more quickly. As described with reference to FIGS. 1-4, prior to configuring the communication circuit 580, configuration settings used by the system design for the communication circuit 580 are determined. The configuration settings may be retrieved, for example, from the on-chip memory 582 or from an external device, not included in the SOC, that is connected to the SOC 550 (e.g., host device 510). The communication circuit 580 is configured using the determined configuration settings. In this manner, the need to reconfigure/reinitialize the communication circuit 580 for operation of the system design 562 and 572 can be avoided.

Figure 6:
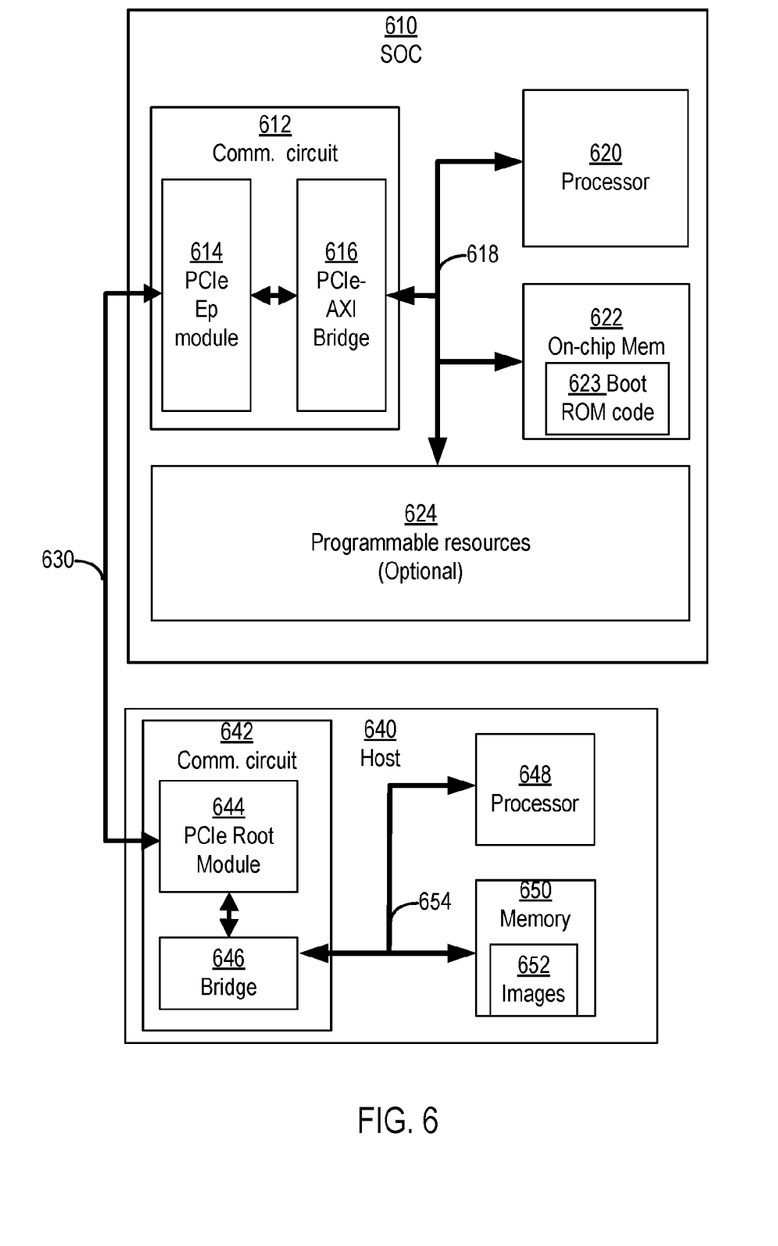
FIG. 6 shows a block diagram of a SOC configured to receive a boot image via an external data bus, consistent with one or more implementations.

FIG. 6 shows a block diagram of a system consistent with one or more implementations of the present disclosure. The system includes a host device 640 and a SOC 610 interconnected by an external data bus 630. According to certain implementations, the SOC 610 includes a processor 620, a memory 622, and a set of programmable resources 624 interconnected by an internal data bus 618. The programmable resources 624 may include several different types of programmable logic blocks that are arranged in an array. For example, the programmable logic can include a large number of different programmable tiles such as multi-gigabit transceivers (MGTs), configurable logic blocks (CLBs), random access memory blocks (BRAMs), input/output blocks (IOBs), configuration and clocking logic, digital signal processing blocks, specialized input/output blocks, for example, clock ports, and other programmable logic such as digital clock managers, analog-to-digital converters, system monitoring logic, and so forth. The SOC 610 also includes a data bus interface 612 configured to communicate data between the internal data bus 618 and the external data bus 630. In this example, the data bus interface 612 includes an endpoint module 614 configured to communicate data via the external bus. A bridge circuit 616 is configured to facilitate transfer of data between the endpoint module 614 and the internal data bus 618.

In some implementations, the host device 640 includes a processor circuit 648 and local memory 650 interconnected by a local bus 654. In certain implementations, the processor circuit 648 and local memory 650 could be part of an X-86 system, for example. However, other types of processor systems are also possible. The host device 640 also includes a bus interface 642 configured to communicate data over the external data bus 630. In this example, the bus interface 642 includes a root module 644 that is configured to operate as the root complex for external data bus. The bus interface 642 also includes a bridge circuit 646 configured to transfer data between the root module 644 and the internal data bus 654 of the host device 640.

As previously indicated, data buses may be implemented using various data bus architectures. In this example, the external data bus 630 is implemented using the PCIe architecture and internal data buses 618 and 654 are implemented using the AXI architecture. However, any of the data busses 618, 630, and/or 654 may be implemented using other data bus architectures as well.

Images for booting of the SOC are stored in the memory 650 of the host device 640. At start-up of the SOC, processor 620 can function as a boot processor that loads boot ROM code 623 from a non-volatile memory (e.g., 622). The boot ROM code can contain instructions that causes the processor 620 to configure a communication circuit 612 and/or retrieve one or more boot images 652 from the memory 650 on the host device 640, for example, using the processes shown in FIG. 1, 2, 3, or 4. Execution of the boot images causes the processor 620 to configure the programmable resources and/or processor 620 to implement the system design. As previously indicated, in some implementations the execution of one or more of the boot images may cause the processor 620 to retrieve configuration settings used by the system design and/or configure the communication circuit 612.

According to some implementations, portions of data (e.g., configuration settings, boot image addresses, and/or notifications) may be communicated between the SOC 610 and the host device 620 by writing data to a scratch pad memory region of on-chip memory 622. A software driver running on the host device 640 can be configured to detect when a flag is set in the scratch pad memory region of on-chip memory 622. This detection can include, for example, polling the scratch pad memory region. Additionally or alternatively, the SOC may prompt bridge circuit 646 to generate a local shared peripheral interrupt to the processor 648. The host device 640 can respond to detection of the flag by communicating the configuration settings and/or address of the boot image(s) on the host device.

Execution of the FSBL image causes the processor 620 to configure the data bus interface 612 to perform egress address translation mapping a first block of addresses for the internal data bus 618 to a second block of addresses for the internal data bus 654 starting at the received memory address. As previously described, the address translation allows the processor 620 on the SOC 610 to issue data transactions to the second block of addresses in memory 650 via the first block of addresses. When the host enables bus mastering of the external data bus 630, execution of the FSBL image causes the processor 620 to retrieve the SSBL image by issuing read requests to addresses in the first block of addresses. As previously described, because read requests are issued directly by the processor on the SOC, a dedicated DMA control circuit may be omitted and manufacturing costs may be reduced. After the SSBL is successfully retrieved, the SSBL image is executed by the processor 620.

Figure 7:
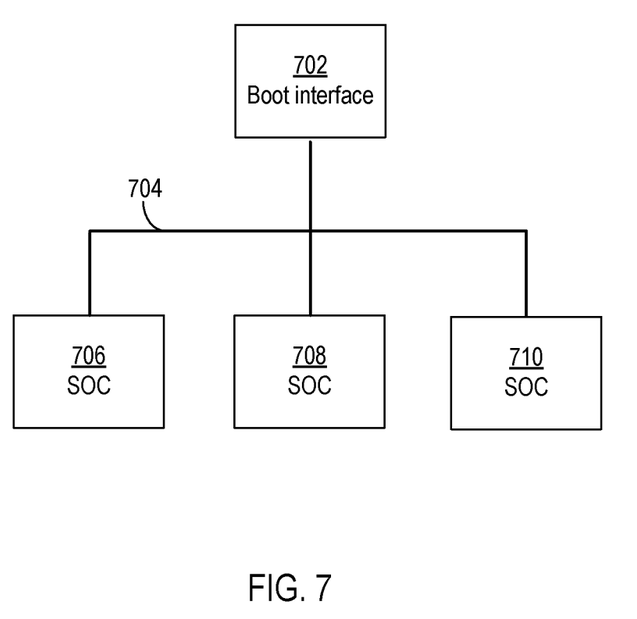
FIG. 7 shows a block diagram of a system including multiple SOCs configured to boot from a shared boot device according to one or more the disclosed processes.

FIG. 7 shows a block diagram of a system including multiple SOCs configured to boot from a shared boot device according to one or more the disclosed processes. In this example, the system includes three SOC 706, 708, and 710 are each connected to a shared boot interface circuit 702 via a shared data bus 704. In some implementations, each of the SOCs 706, 708, and 710 may retrieve a respective boot image from the shared boot interface circuit 702. The boot interface circuit 702 may store boot images used by the SOCs 706, 708, and 710 or may be communicatively connected to another storage device (not shown) that stores the boot images. Sharing of the boot interface between the SOCs 706, 708, and 710 reduces manufacturing costs of the system. However, boot time can be greatly increased if each SOCs 706, 708, and 710 attempts to reconfigure and reinitialize the shared bus 704 when retrieving the boot image(s). In some implementations, each of the SOCs 706, 708, and 710 is configured to determine and use the configuration settings used by the system design for communication over the shared bus 704, for example, as described with reference to FIG. 1, 2, 3, or 4. Because each of the SOCs 706, 708, and 710 and the system design to be implemented use the same settings for communication via the data bus 704, repeated configuration and initialization of the data bus 704 can be avoided.

Figure 8:
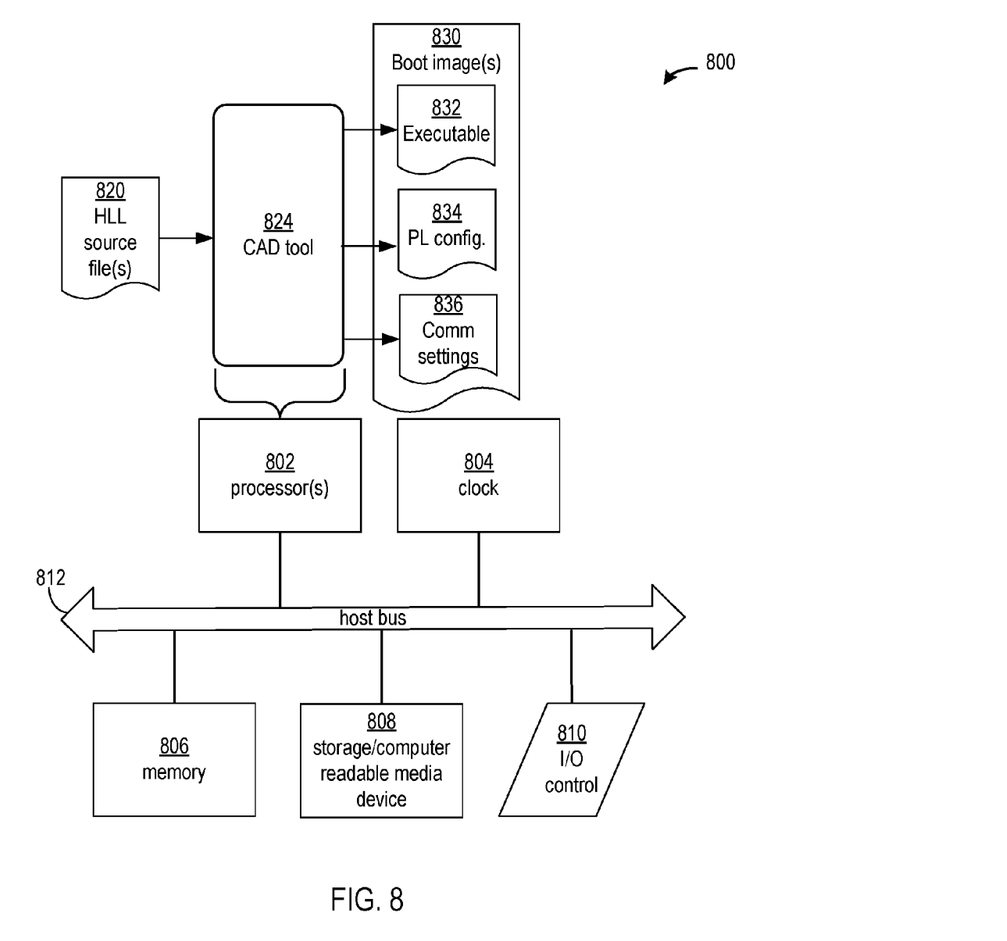
FIG. 8 shows a computing system that may be used to configured a system on chip to boot according to one or more the disclosed processes.

FIG. 8 shows a block diagram of an example computing arrangement that may be configured to implement the data structures and processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 800 includes one or more processors 802, a clock signal generator 804, a memory arrangement 806, and an input/output control unit 810, all coupled to a host bus 812. The arrangement 800 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 802 may be one or more general purpose processors, or a combination of one or more general purpose processors and suitable co-processors, or one or more specialized processors (e.g., RISC, CISC, pipelined, etc.). The memory arrangement 806 typically includes multiple levels of cache memory, and a main memory. The memory arrangement 806 may include local and/or remote persistent storage, such as provided by magnetic disks (not shown), flash, EPROM, or other non-volatile data storage. The memory arrangement 806 may be read or read/write capable.

The processor(s) 802 executes the software in the memory arrangement 806, reads data from and stores data to the memory arrangement 806, and communicates with external devices through the input/output control arrangement 810. These functions are synchronized by the clock signal generator 804. The resources of the computing arrangement may be managed by either an operating system (not shown), or a hardware control unit (not shown).

In some implementations, the memory arrangement 806 stores a set of instructions that, when executed, cause the processor 802 to provide a CAD tool 824. The CAD tool 824 may provide a GUI configured to aid in the design, simulation and/or testing of system designs. In some implementations, the CAD tool 824 may be configured to automatically compile an HLL source file 820 for implementation of a system design on a SOC (e.g., 550 in FIG. 5). The CAD tool 824 may be configured to identify and determine subsets of function calls to hardware accelerated functions for implementation in programmable logic resources of the SOC. The CAD tool 824 generates sets of programmable logic (PL) configuration data 832 for implementation of hardware accelerated functions. The CAD tool may also supplement the HLL source file 820 with HLL code (e.g., interface code) to communicate data between HLL function calls and hardware accelerated functions implemented by the PL configuration data 834. The CAD tool compiles the supplemented HLL source file to produce an executable program 832 configured for execution on a processor of a SOC. The CAD tool 824 may be configured to determine communication configuration settings 836 used by the system design. The CAD tool 824 may package the executable 832, PL configuration data 834, and or communication configuration settings 836 into one or more boot images 830 for booting of the SOC. Alternatively, as previously described, the configuration settings may be stored in the SOC in advance or provided to the SOC separately during boot.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

Figure 9:
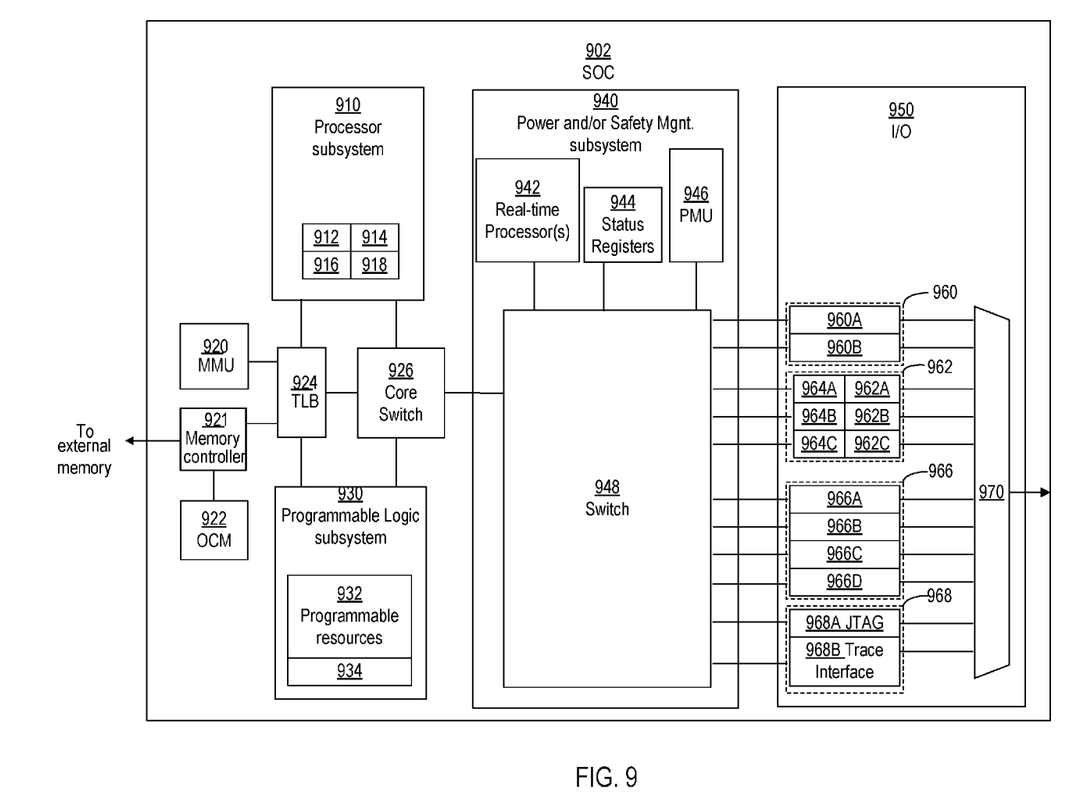
FIG. 9 shows a system on chip that may be configured to boot according to one or more the disclosed processes.

FIG. 9 shows an example SOC that may be configured using the disclosed processes. The SOC includes a processor sub-system 910 and a programmable logic sub-system 930. In this example, the SOC also includes a sub-system 940 having various circuits for power and/or safety management and an input/output (I/O) sub-system 950 for communication of data with external circuits. The subsystems 910, 930, 940, and 950 may be formed using a plurality of semiconductor dies, and interconnected in an IC package as described in the above examples.

The processing sub-system 910 may be programmed to implement a software portion of the circuit design, via execution of a user program. Alternatively or additionally, the program may implement one or more traffic generators configured to generate data signals to one or more ports of a partial circuit design implemented in programmable resources 932. The program may be specified as part of a configuration data stream or may be retrieved from an on-chip or off-chip data storage device. The processing sub-system 910 may include various circuits 912, 914, 916, and 918 for executing one or more software programs. The circuits 912, 914, 916, and 918 may include, for example, one or more processor cores, floating point units (FPUs), an interrupt processing unit, on chip-memory, memory caches, and/or cache coherent interconnect.

The programmable logic sub-system 930 of the SOC 902 may be programmed to implement a partial circuit design and traffic generation circuits as previously discussed. For instance, the programmable logic sub-system may include a number of programmable resources 932, which may be programmed to implement a set of circuits specified in a configuration data stream. The programmable resources 932 include programmable interconnect circuits, programmable logic circuits, and configuration memory cells. The programmable logic implements the logic of a circuit design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 932 may be programmed by loading a configuration data stream into the configuration memory cells, which define how the programmable interconnect circuits and programmable logic circuits are configured. The collective states of the individual memory cells then determine the function of the programmable resources 932. The configuration data can be read from memory (e.g., from an external PROM) or written into the SOC 902 by an external device. In some implementations, configuration data may be loaded into configuration memory cells by a configuration controller 934 included in the programmable logic sub-system 930. In some other implementations, the configuration data may be loaded into the configuration memory cells by a start-up process executed by the processor sub-system 910.

The SOC 902 may include various circuits to interconnect the processing sub-system 910 with circuitry implemented within the programmable logic sub-system 930. In this example, the SOC 902 includes a core switch 926 that can route data signals between various data ports of the processing sub-system 910 and the programmable logic sub-system 930. The core switch 926 may also route data signals between either of the programmable logic or processing sub-systems 910 and 930 and various other circuits of the SOC, such as an internal data bus. Alternatively or additionally, the processing sub-system 910 may include an interface to directly connect with the programmable logic sub-system—bypassing the core switch 926. Such an interface may be implemented, for example, using the AMBA AXI Protocol Specification (AXI) as published by ARM.

In some implementations, the processing sub-system 910 and the programmable logic sub-system 930 may also read or write to memory locations of an on-chip memory 922 or off-chip memory (not shown) via memory controller 921. The memory controller 921 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 921 is able to communicate is provided for purposes of illustration only and is not intended as a limitation or to be exhaustive. As shown in FIG. 9, the SOC 902 may include a memory management unit 920 and translation look-aside buffer 924 to translate virtual memory addresses used by the sub-systems 910 and 930 to physical memory addresses used by the memory controller 921 to access specific memory locations.

In this example, the SOC includes an I/O sub-system 950 for communication of data with external circuits. The I/O sub-system 950 may include various types of I/O devices or interfaces including for example, flash memory type I/O devices, higher performance I/O devices, lower performance interfaces, debugging I/O devices, and/or RAM I/O devices.

The I/O sub-system 950 may include one or more flash memory interfaces 960 illustrated as 960A and 960B. For example, one or more of flash memory interfaces 960 can be implemented as a Quad-Serial Peripheral Interface (QSPI) configured for 4-bit communication. One or more of flash memory interfaces 960 can be implemented as a parallel 8-bit NOR/SRAM type of interface. One or more of flash memory interfaces 960 can be implemented as a NAND interface configured for 8-bit and/or 16-bit communication. It should be appreciated that the particular interfaces described are provided for purposes of illustration and not limitation. Other interfaces having different bit widths can be used.

The I/O sub-system 950 can include one or more interfaces 962 providing a higher level of performance than flash memory interfaces 960. Each of interfaces 962A-962C can be coupled to a DMA controller 964A-964C respectively. For example, one or more of interfaces 962 can be implemented as a Universal Serial Bus (USB) type of interface. One or more of interfaces 962 can be implemented as a gigabit Ethernet type of interface. One or more of interfaces 962 can be implemented as a Secure Digital (SD) type of interface. One or more of interfaces 962 can be implemented as a PCIe interface.

The I/O sub-system 950 may also include one or more interfaces 966 such as interfaces 966A-966D that provide a lower level of performance than interfaces 962. For example, one or more of interfaces 966 can be implemented as a General Purpose I/O (GPIO) type of interface. One or more of interfaces 966 can be implemented as a Universal Asynchronous Receiver/Transmitter (UART) type of interface. One or more of interfaces 966 can be implemented in the form of a Serial Peripheral Interface (SPI) bus type of interface. One or more of interfaces 966 can be implemented in the form of a Controller-Area-Network (CAN) type of interface and/or an $I^2C$ type of interface. One or more of interfaces 966 also can be implemented in the form of a Triple Timer Counter (TTC) and/or a Watchdog Timer (WDT) type of interface.

The I/O sub-system 950 can include one or more debug interfaces 968 such as processor JTAG (PJTAG) interface 968A and a trace interface 968B. PJTAG interface 968A can provide an external debug interface for the SOC 902. Trace interface 968B can provide a port to receive debug, e.g., trace, information from the processing sub-system 910 or the programmable logic sub-system 930.

As shown, each of interfaces 960, 962, 966, and 968 can be coupled to a multiplexer 970. Multiplexer 970 provides a plurality of outputs that can be directly routed or coupled to external pins of the SOC 902, e.g., balls of the package within which the SOC 902 is disposed. For example, I/O pins of SOC 902 can be shared among interfaces 960, 962, 966, and 968. A user can configure multiplexer 970, via a configuration data stream to select which of interfaces 960-968 are to be used and, therefore, coupled to I/O pins of SOC 902 via multiplexer 970. The I/O sub-system 950, may also include a fabric multiplexer I/O (FMIO) interface (not shown) to connect interfaces 962-968 to programmable logic circuits of the programmable logic sub-system. Additionally or alternatively, the programmable logic sub-system 930 can be configured to implement one or more I/O circuits within programmable logic. In this example, the SOC 902 includes sub-system 940 having various circuits for power and/or safety management. For example, the sub-system 940 may include a power management unit 946 configured to monitor and maintain one or more voltage domains used to power the various sub-systems of the SOC 902. In some implementations, the power management unit 946 may disable power of individual sub-systems, when idle, to reduce power consumption, without disabling power to sub-systems in use.

The sub-system 940 may also include safety circuits to monitor the status of the sub-systems to ensure correct operation. For instance, the sub-system 940 may include one or more real-time processors 942 configured to monitor the status of the various sub-systems (e.g., as indicated in status registers 944). The real-time processors 942 may be configured to perform a number of tasks in response to detecting errors. For example, for some errors, the real-time processors 942 may generate an alert in response to detecting an error. As another example, the real-time processors 942 may reset a sub-system to attempt to restore the sub-system to correct operation. The sub-system 940 includes a switch network 948 that may be used to interconnect various sub-systems. For example, the switch network 948 may be configured to connect the various sub-systems 910, 930, and 940 to various interfaces of the I/O sub-system 950. In some applications, the switch network 948 may also be used to isolate the real-time processors 942 from the sub-systems that are to be monitored. Such isolation may be required by certain application standards (e.g., IEC-61508 SIL3 or ISO-26262 standards) to ensure that the real-time processors 942 are not affected by errors that occur in other sub-systems.

The methods and system are thought to be applicable to a variety of systems that use SOCs. Other aspects and features will be apparent to those skilled in the art from consideration of the specification. For instance, although aspects and features may in some cases be described in individual figures, it will be appreciated that features from one figure can be combined with features of another figure even though the combination is not explicitly shown or explicitly described as a combination. The portions of the methods and system may be implemented as one or more processors configured to execute software, as an application specific integrated circuit (ASIC), or as a logic on a programmable logic device. Moreover, the various circuits identified herein may share hardware circuitry, such as use a common computer processing unit or digital processing unit. It is intended that the specification and drawings be considered as examples only, with a true scope of the invention being indicated by the following claims.

What is claimed is:

1. A method for configuring an integrated circuit (IC) to implement a system design, the method comprising:
   executing boot-read-only-memory (boot ROM) code on a processor circuit on the IC, wherein execution of the boot ROM code causes the processor circuit to determine settings to be used by the system design for communicating data via a communication circuit on the IC;
   configuring the communication circuit by the processor circuit according to the determined settings;
   in response to receiving one or more boot images by the processor circuit, via the communication circuit configured according to the determined settings, executing the one or more boot images by the processor circuit, wherein execution of the one or more boot images causes the processor circuit to configure the IC to implement the system design; and
   communicating data via the communication circuit configured according to the determined settings by operation of the system design implemented on the IC.

2. The method of claim 1, wherein the receiving of the one or more boot images, via the communication circuit with the settings determined to be used by the system design, allows the IC to forgo reconfiguration of the communication circuit prior to the communication of data by operation of the system design.

3. The method of claim 1, wherein the determination of the settings used by the system design for communicating data via the communication circuit on the IC includes retrieving the settings from a non-volatile memory included on the IC.

4. The method of claim 1, wherein the determination of the settings used by the system design for communicating data via the communication circuit on the IC includes retrieving the settings from an external device using programmable input/output data transfers.

5. The method of claim 1, wherein the receiving of the one or more boot images includes:
   retrieving a first boot image of the one or more boot images via the configured communication circuit by execution of the boot ROM code; and
   executing the first boot image, wherein execution of the first boot image causes the processor circuit to retrieve a second boot image of the one or more boot images via the configured communication circuit.

6. The method of claim 5, wherein the configuring the IC to implement the system design includes executing of the second boot image.

7. The method of claim 1, wherein the configuration of the IC to implement the system design causes the processor circuit of the IC to execute a software portion of the system design.

8. The method of claim 7, wherein the configuration of the IC by the processor circuit includes configuration of a set of programmable hardware resources of the IC to implement a circuit specified by a hardware portion of the system design.

9. The method of claim 1, wherein:
   the one or more boot images includes a first boot image and a second boot image;
   the settings used by the system design are specified in the first boot image; and
   the configuring the communication circuit according to the determined settings is performed by execution of the first boot image.

10. The method of claim 1, wherein the determined settings specify a transmission rate for the communication circuit.

11. The method of claim 1, further comprising:
    determining, by execution of the boot ROM code, whether or not the settings are stored in a non-volatile memory included on the IC; and
    in response to the settings being absent in the non-volatile memory:
       configuring the communication circuit according to settings specified in the boot ROM code;
       receiving the one or more boot images by the processor circuit, via the communication circuit configured according to the settings specified in the boot ROM code;
       executing the one or more boot images by the processor circuit, wherein execution of the one or more boot images causes the processor circuit to configure the IC to implement the system design;
       determining the settings used by the system design for communication via the communication circuit;
       reconfiguring the communication circuit according to the determined settings used by the system design; and
       storing the determined settings used by the system design in the non-volatile memory.

12. An integrated circuit (IC), comprising:
    an internal data bus,
    a non-volatile memory coupled to the internal data bus,
    a communication circuit coupled to the internal data bus and configured to communicate via an external data bus coupled to the IC; and
    a processor circuit coupled to the internal data bus; and
    wherein the processor circuit is configured to, when powered on, retrieve and execute a set of boot-read-only-memory (boot ROM) code stored in the non-volatile memory;
    wherein execution of the boot ROM code causes the processor circuit to:
       determine settings stored in a device coupled to the external data bus, the settings used by a system design for communicating data via the communication circuit;
       configure the communication circuit according to the determined settings; and
       in response to receiving one or more boot images, via the communication circuit configured according to the determined settings, execute the one or more boot images; and
    wherein execution of the one or more boot images causes the processor circuit to configure the IC to implement the system design.

13. The IC of claim 12, wherein the receiving of the one or more boot images, via the communication circuit according to the determined settings, allows the IC to forgo reconfiguration of the communication circuit prior to the communication of data by operation of the system design.

14. The IC of claim 12, wherein the processor circuit is configured to determine the settings used by the system design by retrieving the settings from a non-volatile memory included on the IC.

15. The IC of claim 12, wherein the processor circuit is configured to determine the settings used by the system design by retrieving of the settings from an external device using programmable input/output data transfers.

16. The IC of claim 12, wherein:
the execution of the boot ROM code causes the processor circuit to retrieve a first boot image of the one or more boot images via the configured communication circuit and execute the first boot image; and
the execution of the first boot image causes the processor circuit to retrieve a second boot image via the configured communication circuit and execute the second boot image.

17. The IC of claim 16, the execution of the first second boot image causes the processor circuit to perform the configuring of the IC to implement the system design.

18. The IC of claim 12, wherein:
the configuring of the IC to implement the system design causes includes configuring of a set of programmable hardware resources to implement a circuit specified by a hardware portion of the system design; and
the configuring of the IC to implement the system design causes the processor circuit of the IC to execute a software portion of the system design.

19. The IC of claim 12, wherein:
the one or more boot loaders includes a first boot image and a second boot image;
the settings used by the system design are specified in the first boot image; and
the configuring the communication circuit according to the determined settings is performed by execution of the first boot image.

20. The IC of claim 12, wherein
execution of the boot ROM code causes the processor circuit to determine whether or not the settings used by the system design are stored in the non-volatile memory; and
in response to the settings being absent in the non-volatile memory, the processor circuit is configured to:
configure the communication circuit according to settings specified in the boot ROM code;
receive the one or more boot images, via the communication circuit configured according to the settings specified in the boot ROM code; and
configure the IC to implement the system design by execution of the one or more boot images; and
determine the settings used by the system design for communication via the communication circuit;
reconfigure the communication circuit according to the determined settings used by the system design; and
store the determined settings used by the system design in the non-volatile memory.

* * * * *